(12) United States Patent
Rowland

(10) Patent No.: US 10,794,028 B1
(45) Date of Patent: Oct. 6, 2020

(54) FLEXIBLE EROSION CONTROL FOR EQUIPMENT PADS

(71) Applicant: J.F.R. Enterprises, Inc., Johns Creek, GA (US)

(72) Inventor: Jay F. Rowland, Johns Creek, GA (US)

(73) Assignee: J.F.R. Enterprises, Inc., Johns Creek, GA (US)

( * ) Notice: Subject to any disclaimer, the term of this patent is extended or adjusted under 35 U.S.C. 154(b) by 0 days.

(21) Appl. No.: 16/365,851

(22) Filed: Mar. 27, 2019

Related U.S. Application Data

(63) Continuation-in-part of application No. 15/615,086, filed on Jun. 6, 2017, now Pat. No. 10,246,844, which is a continuation of application No. 14/279,544, filed on May 16, 2014, now Pat. No. 9,702,106, which is a continuation of application No. 13/045,085, filed on Mar. 10, 2011, now Pat. No. 8,740,505.

(60) Provisional application No. 61/313,088, filed on Mar. 11, 2010.

(51) Int. Cl.
*E02D 3/00* (2006.01)
*F16M 5/00* (2006.01)
*E02D 17/00* (2006.01)

(52) U.S. Cl.
CPC ............... *E02D 3/00* (2013.01); *E02D 17/00* (2013.01); *F16M 5/00* (2013.01)

(58) Field of Classification Search
CPC combination set(s) only.
See application file for complete search history.

(56) References Cited

U.S. PATENT DOCUMENTS

| | | | |
|---|---|---|---|
| 2002/0044842 A1* | 4/2002 | Ianniello | E01C 3/00 405/302.7 |
| 2006/0153648 A1* | 7/2006 | Carpenter | E02B 3/122 405/302.6 |

* cited by examiner

*Primary Examiner* — Kyle Armstrong
(74) *Attorney, Agent, or Firm* — Eric W. Cernyar

(57) ABSTRACT

A flexible erosion control barrier for an outdoor equipment support pad generally comprises a geosynthetic soil retention barrier with a reinforced attachment area along a side configured to facilitate its attachment about a perimeter of the support pad. The soil retention barrier has an opposing, unjoined portion that extends outward from the side walls of the support pad, such that the soil retention barrier can fold up or down outside the perimeter of the support pad. Flexibility of the geosynthetic material allows a full or partially surrounding skirt to be configured to overlay the ground to re-direct drainage or to form an erosion-resisting corner fold in the ground around the soil under a side corner of the support pad. A strip of material that is more durable than the soil retention barrier material may protect the attachment area from damage after installation.

20 Claims, 17 Drawing Sheets

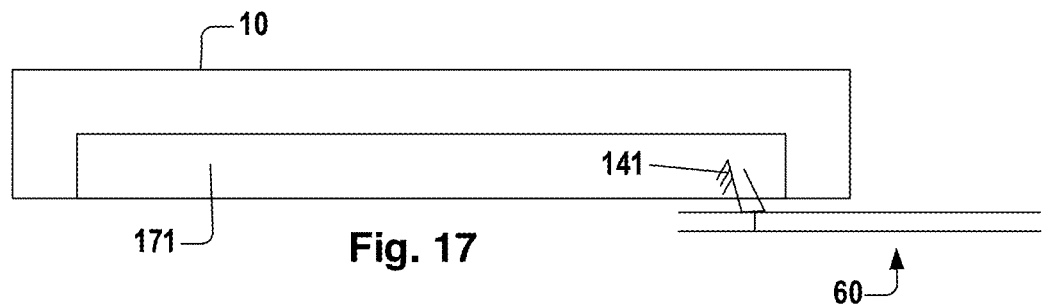
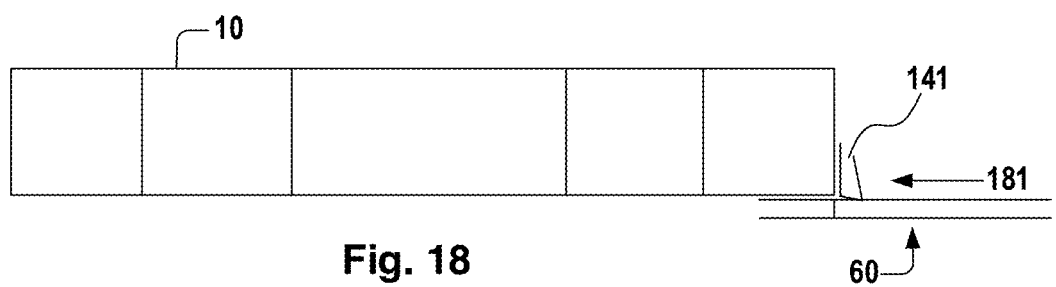
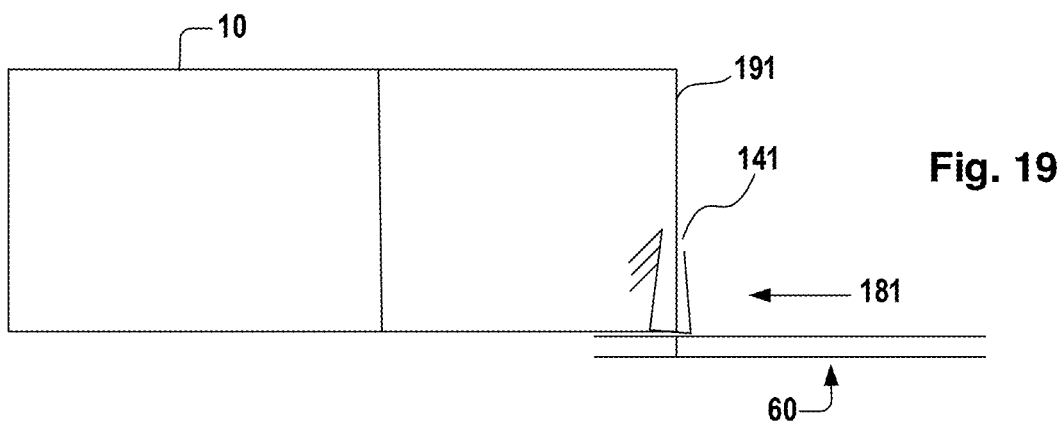
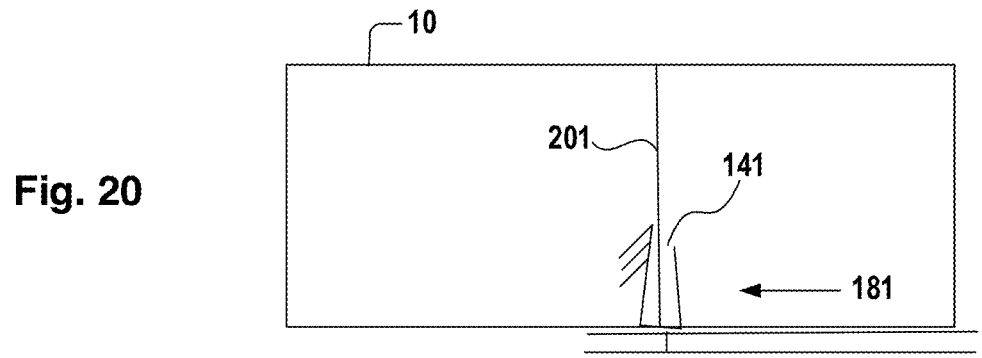

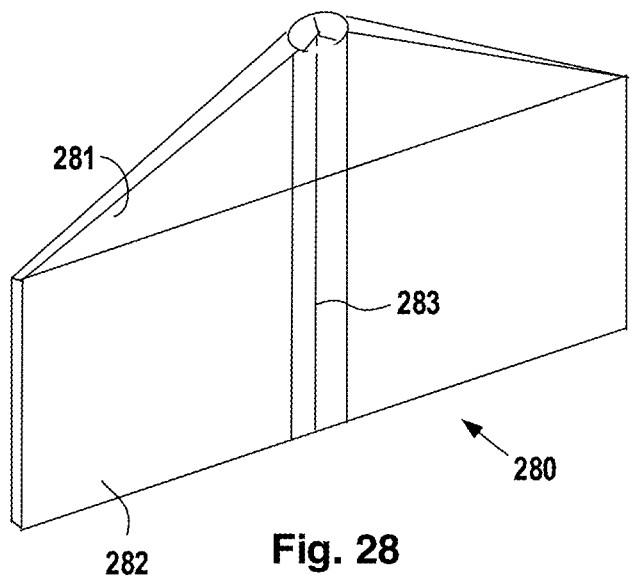
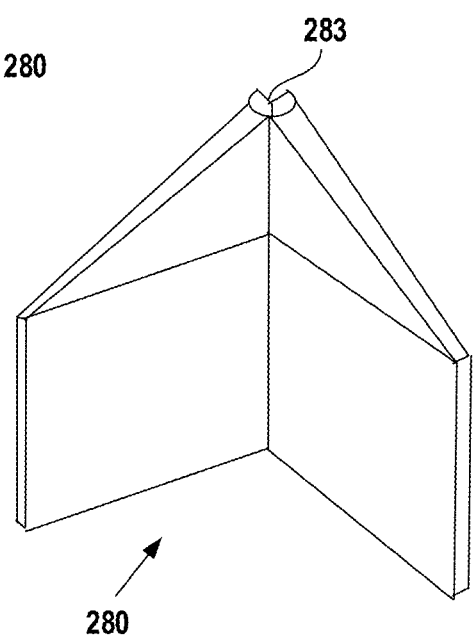
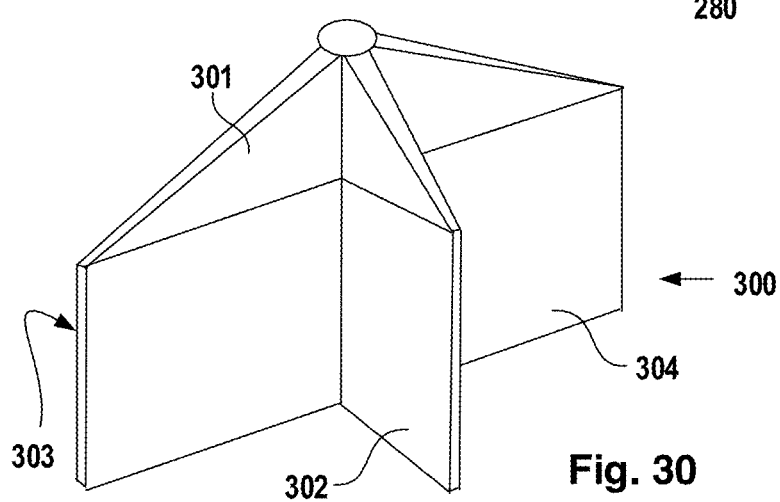

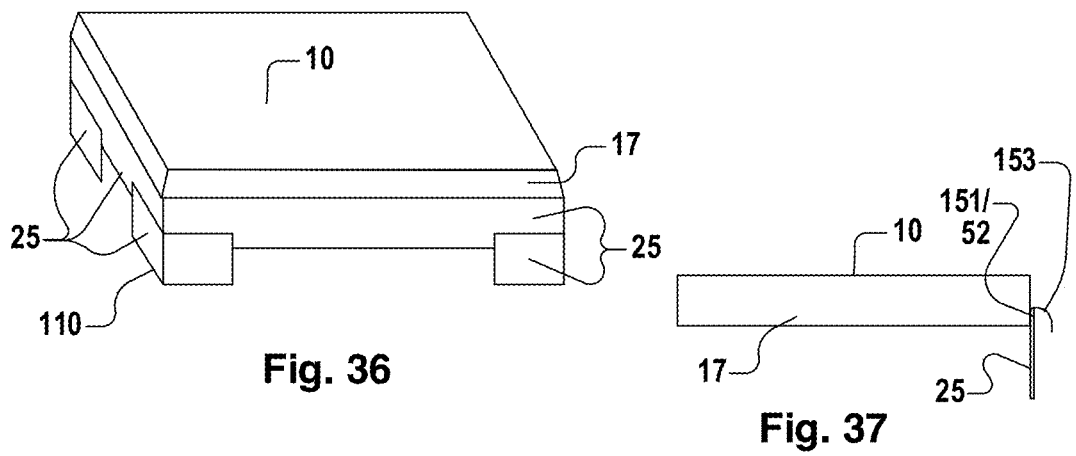
Fig. 36
Fig. 37
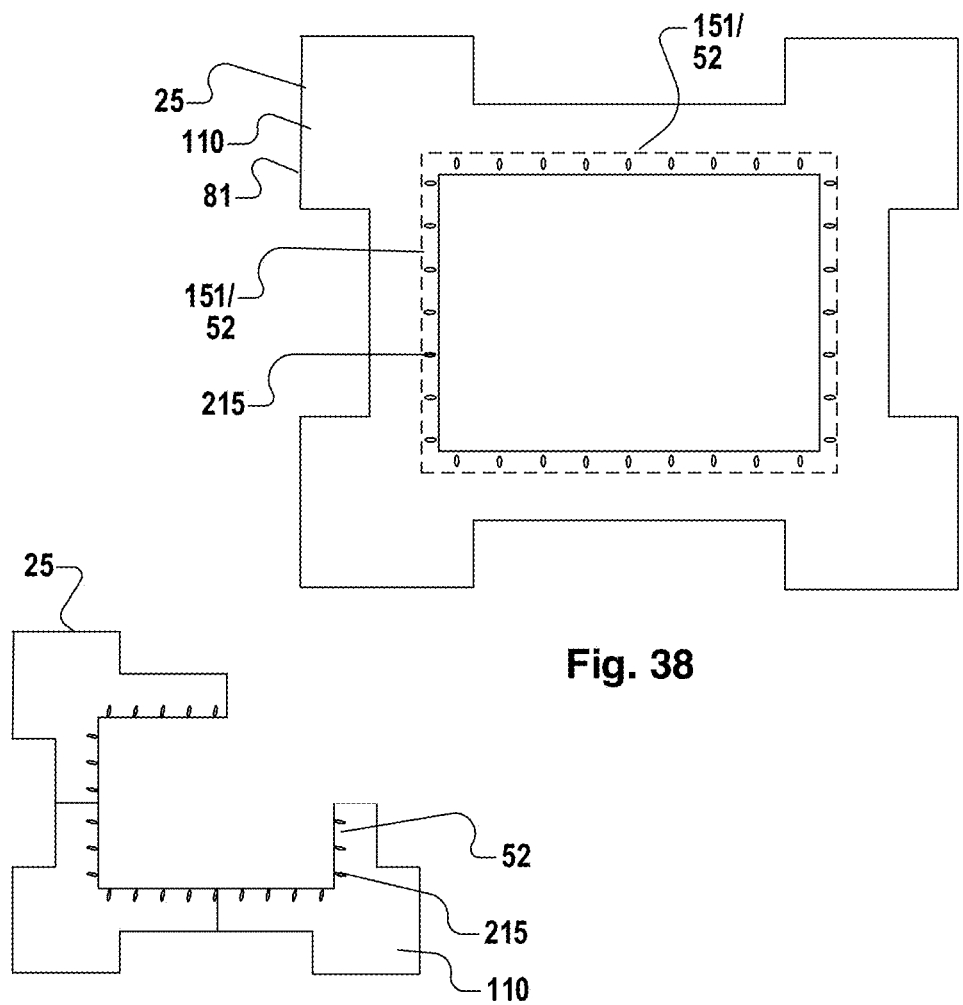
Fig. 38
Fig. 39

FLEXIBLE EROSION CONTROL FOR EQUIPMENT PADS

RELATED APPLICATIONS

This application is a continuation-in-part of U.S. Pat. No. 10,246,844, issued Apr. 2, 2019, entitled "Equipment Pad with Erosion Control," which is a continuation of U.S. Pat. No. 9,702,106, issued Jul. 11, 2017, entitled "Erosion Control Equipment Pads and Accessories," which is a continuation of U.S. Pat. No. 8,740,505, issued Jun. 3, 2014, entitled "Erosion Control Methods and Products for Equipment Pads," which claims the benefit of U.S. Provisional Patent Application No. 61/313,088, filed on Mar. 11, 2010, entitled "Erosion Control Methods and Products." All of the foregoing patents are incorporated herein by reference for all purposes.

FIELD OF THE INVENTION

This invention relates generally to equipment support pads, and more particularly, to products and methods for preventing and controlling erosion of ground underneath and around equipment pads.

BACKGROUND OF THE INVENTION

Millions of homes and businesses are equipped with air conditioning and/or heating systems that include an outdoor unit or condenser 15. These outdoor units are typically installed on an equipment pad 10 resting on a non-foundation grade 11. In similar fashion, residential generators are installed on prefab pads, and power companies install transformers on prefab equipment pads placed on grade. Very frequently, the soil beneath the pad begins to erode, as illustrated by the erosion 13 in FIG. 1. Average annual soil loss around an equipment pad in the U.S. may reach 0.9"/year, depending upon rainfall and soil conditions. Even if a pad is installed according to current industry norms, odds are high that the ground underneath its downslope edges will erode over time.

Eventually, the pad can become destabilized and begin to tilt. In any event, the result is unsightly. Repair frequently involves simply backfilling soil or rocks where the erosion has occurred, but this solution is temporary, as the backfilled soil soon erodes away.

Although installers and homeowners understand that "nature happens," they are uneasy and displeased with the look of a dangling unit, which is an expensive system component. The result also reflects poorly on the contractor. But contractors and homeowners are daunted by the effort and cost for example, excavating and placing a foundation or footer that they believe would be required to prevent the problem. Little thought has been given to inexpensive, low-labor systems or methods to prevent the erosion from occurring in the first place.

SUMMARY OF THE INVENTION

A flexible erosion control barrier for an outdoor equipment support pad (for a condenser, generator, or transformer) generally comprises a geosynthetic soil retention barrier that has a reinforced attachment area along a side or edge of the barrier configured to facilitate and maintain attachment of the erosion control barrier to the support pad. The reinforced attachment area of the soil retention barrier is configured to be attached to the support pad about a perimeter of the support pad and to have an opposing, unjoined portion that extends outward from the side walls of the support pad, such that the soil retention barrier is configured to fold up or down outside the perimeter of the support pad. Flexibility of the geosynthetic material facilitates its manipulation into an erosion-resisting configuration around at least one side corner of the support pad after the support pad is placed above ground that is subject to erosion. Together, the equipment support pad and erosion control barrier work to deter erosion from under the pad.

The soil retention barrier, which may form a full or partially surrounding skirt with an opening sized to fit the perimeter of the support pad, may be configured to overlay the ground to re-direct drainage or to form an erosion-resisting corner fold in the ground around the soil under a side corner of the support pad. Any pore openings in the barrier are small enough to prevent soil from passing through.

The flexible erosion control barrier may further comprise a long strip of material, located along the reinforced attachment area, that is more durable than the soil retention barrier material and is configured to aid attachment or to protect the attachment area from damage after installation.

In one version, the soil retention barrier material is configured to be inserted deeper into the ground at the corner of the support pad than at the middle of the sides of the support pad.

In another embodiment, erosion control kits may comprise one or more leveling support members, beams, or brackets for leveling the support pad. The leveling support members are configured for placement under the support pad and above sloped, eroded soil. Kits may also comprise mechanical attachment members configured to attach the erosion control barrier to both concrete side walls and plastic side walls.

BRIEF DESCRIPTION OF THE DRAWINGS

The drawings are not to scale, and like numbers are used throughout.

FIG. 17 is a cross sectional view of a multi-layered fabric assembly coupled to the foam core of an equipment pad through a toothed clip.

FIG. 18 is a cross sectional view of a multi-layered fabric assembly coupled to the side of an equipment pad via a mechanical fastener.

FIG. 19 is a cross sectional view of a multi-layered fabric assembly joined to a toothed clip clamped on an outside edge of the pad and anchored with a screw.

FIG. 20 is a cross sectional view of a multi-layered fabric assembly joined to a toothed clip clamped to an internal rib of the pad and anchored with a screw.

FIG. 28 illustrates one embodiment of an installation tool to facilitate insertion of a soil retention barrier into the ground.

FIG. 29 illustrates the installation tool of FIG. 28 bent at a 90-degree angle along a hinge line.

FIG. 30 illustrates another embodiment of an installation tool to facilitate insertion of a soil retention barrier into the ground.

FIG. 36 illustrates a flexible soil retention barrier configured for deeper insertion into the ground at the corners than at the sides of the equipment pad.

FIG. 37 is a side view of an equipment pad attached to a soil retention barrier comprising a guard located at an attachment area.

FIG. 38 is a top view of a skirt of flexible soil retention material comprising a reinforced attachment area.

FIG. 39 is a top view of a partially surrounding skirt of flexible soil retention material comprising a reinforced attachment area.

DETAILED DESCRIPTION OF THE INVENTION

In describing preferred and alternate embodiments of the technology described herein, as illustrated in FIGS. 1-42, specific terminology is employed for the sake of clarity. The technology described herein, however, is not intended to be limited to the specific terminology so selected, and it is to be understood that each specific element includes all technical equivalents that operate in a similar manner to accomplish similar functions.

Several embodiments of erosion control apparatuses are provided in this disclosure. All involve a soil retention apparatus driven or tucked into the ground, a geosynthetic material overlaying the adjoining graded soil, or a combination of the two. In some embodiments, accessories are provided for attaching the erosion control apparatus to the equipment pad 10 and/or anchoring a portion of the erosion control apparatus into the ground. The embodiments preferably use durable, geosynthetic materials such as plastic and other geocomposites. In particular, the soil retention apparatus that resides in the ground preferably will last for the life of the equipment pad.

Figure 1:
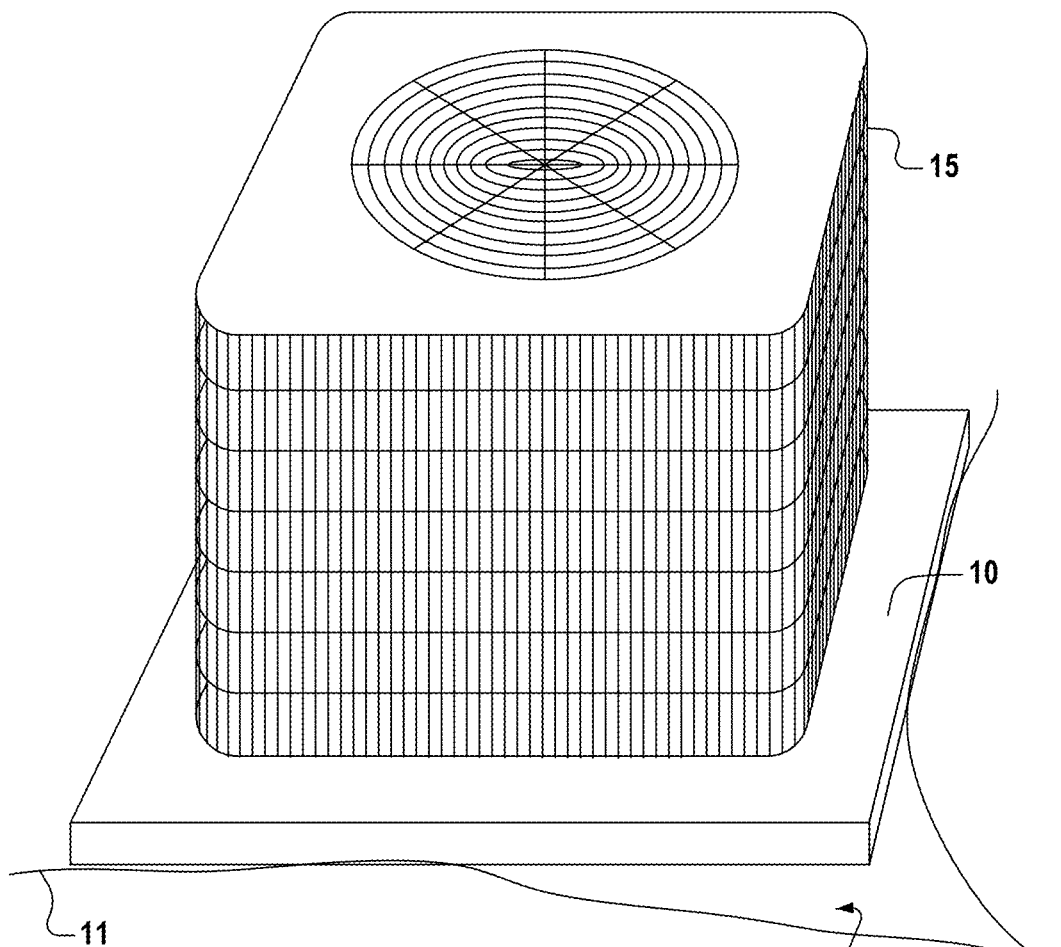
FIG. 1 is a perspective view of an air conditioning unit or condenser on an outdoor equipment pad.
Figure 2:
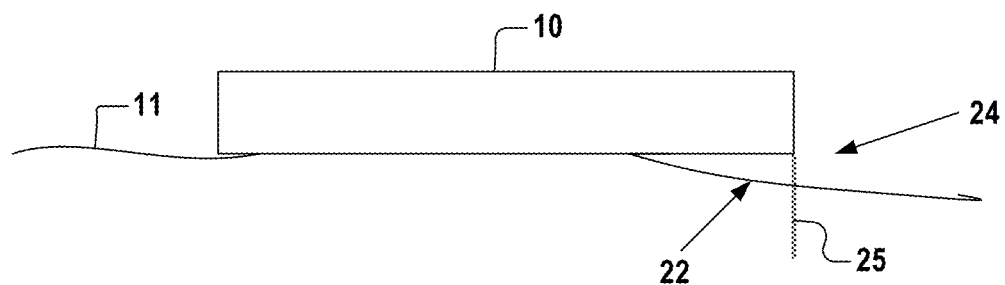
FIG. 2 is a side view of an equipment pad on eroded grade, being prepared for remediation.

FIG. 2 is a side view of an equipment pad 10 on an eroded grade 11, being prepared for remediation in accordance with one embodiment. A primary backfill 22 of soil and/or other materials is made between the eroded grade and the overhanging portion of the pad 10. A slender, nonporous or low-porosity soil retention barrier 25 is inserted or tucked into the ground near the perimeter of the pad 10 along at least the downhill edge(s) of the pad. A secondary backfill 24 is then made against the soil retention barrier 25. This remediation is accomplished without excavation of soil.

In one embodiment, the soil retention barrier 25 is a soft-walled barrier. In a more detailed embodiment, shown more particularly in FIG. 3, the soil retention barrier 25 is a permanently-installed silt fence 35 made of a woven or non-woven geotextile fabric. The silt fence 35 includes a plurality of pore spaces or openings between the fabric fibers that are too small for soil to pass through but that are large enough to allow water to penetrate. The silt fence 35 serves to retain dirt. In one embodiment, the bottom edge of the silt fabric 35 is configured with barbs 37 that are readily grasped by an insertion tool and which serve to further anchor the silt fabric 35 in the ground. Similarly, FIG. 36 illustrates a flexible soil retention barrier 25 in which the barrier 25 has a deeper length of soft or hard barrier material than the corner for deeper insertion into the ground, effectively forming a corner "stake" or "soft anchor" 110. FIGS. 38 and 39 are top views of a full skirt and a partially surrounding skirt, respectively, of a soil retention barrier 25 configured to provide more protection at the pad 10 corners. The barrier 25 may be one piece or multiple pieces as shown in FIG. 39. The barrier 25 with or without corner stake/soft anchor 110 is configured to be manipulated into an erosion-resisting corner fold that preferably forms a continuous wrap around the soil under the corner of the pad 10.

In another embodiment, the soil retention barrier 25 comprises a rigid, "hard-walled" barrier, as described more fully below in connection with FIGS. 21-27.

Figure 4:
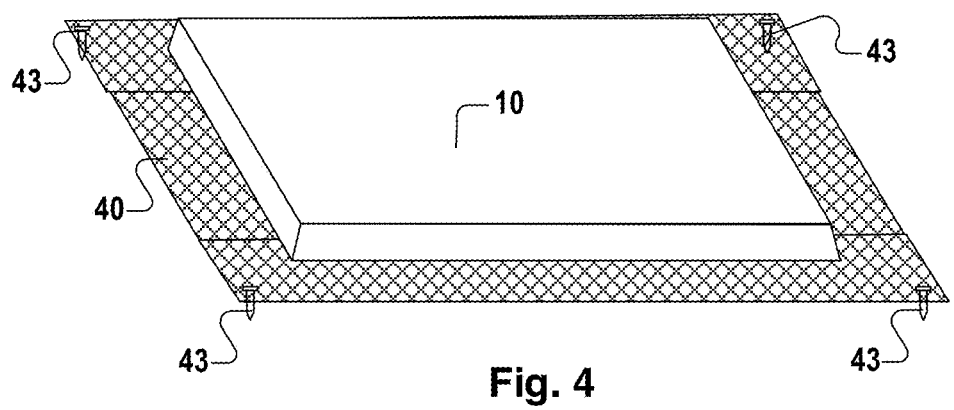
FIG. 4 is a perspective view of an equipment pad surrounded by a skirt of percolating fabric resting over the surrounding soil.

FIG. 4 is a perspective view of an equipment pad 10 completely surrounded by a skirt of four rectangular sections of percolating fabric 40 resting over the soil or ground surrounding the pad 10. The percolating fabric 40 is a porous, three-dimensional matrix of water-trapping voids meant to mimic river stone and allow water to percolate down and away from the pad 10 and fill dirt. The percolating fabric 40 may be embedded with grass seeds (not shown) or include corner attachment pins 43 to anchor the fabric to the ground.

Figure 5B:
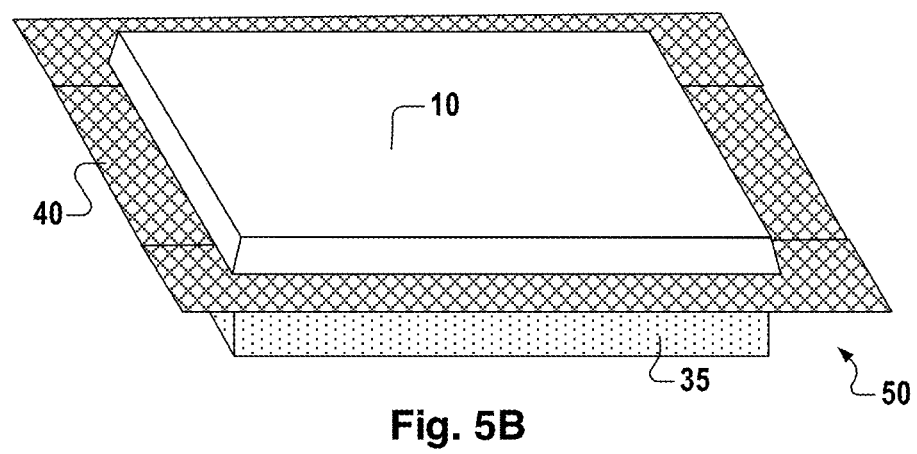
FIG. 5B is a perspective view of an equipment pad surrounded by a two-layer assembly of percolating and silt fabric.
Figure 5A:
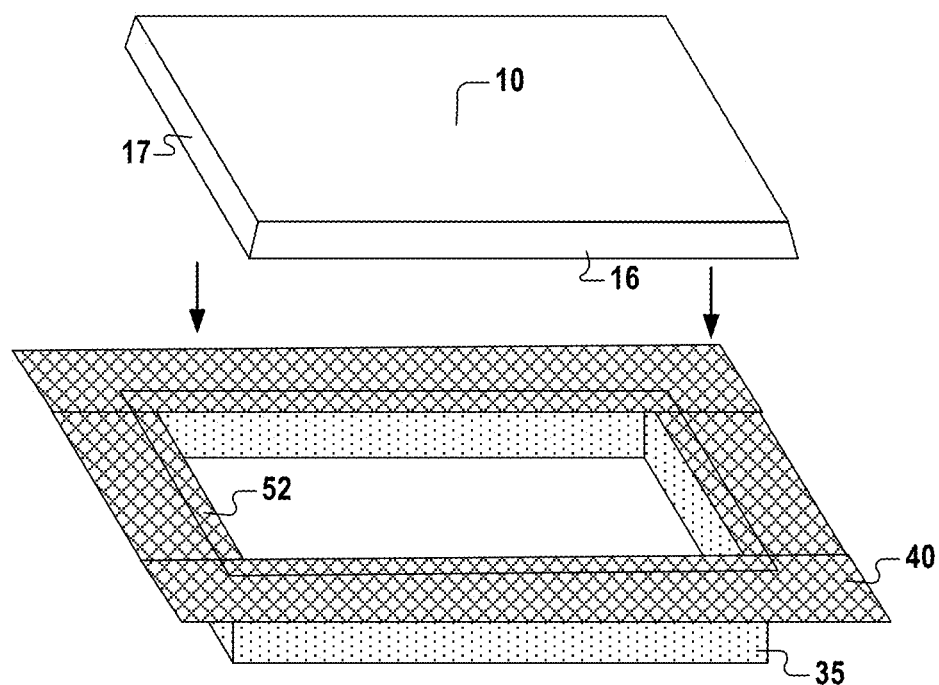
FIG. 5A is an exploded view diagram of a multi-layered fabric skirt installed into and over ground prepared for supporting an equipment pad.

FIGS. 5A and 5B depict an equipment pad 10 surrounded by a two-layer assembly 50 of a silt fence 35 tucked into the ground and a percolating fabric 40 overlaying the ground. The silt fence 35 acts as a barrier to retain soil behind the fence and thereby resists erosion under the pad. The percolating fabric 40, which has larger pores than and is not as dense as the silt fence 35, causes water to seep and spread slowly or gradually in an unsteady pattern. Thus, the water moves outward and away from the pad, minimizing erosion underneath and around the fabric 40.

In operation, the assembly 50 is laid out about the perimeter of an existing or to-be-placed equipment pad 10. The top layer of percolating fabric 40 is folded up, providing access to the bottom silt fence 35. The bottom silt fence 35 is tucked into the ground. The bottom silt fence 35 provides a continuous wrap around the soil under the corner of the equipment pad 10, such that soil does not wash from the corner. If necessary, dirt is backfilled against the silt fence 35. Then, the top layer of percolating fabric 40 is folded back down, over the fill dirt.

A standard installation designed to surround a 36"×36" pad 10 will call for about 20 lineal feet (i.e., 4 sides times 5 feet for each side) of the assembly 50. Typical equipment pads have dimensions in the range of 16"×36" to 60"×67", with base heights ranging from 2" to 4". The silt fence 35 should be tucked into the ground 6" to 1' deep and have an attachment strip 52 under the pad of about 1-2", for a total fabric width of 8" to 1' 2". The top layer of percolating fabric 40 should extend 6" to 1' beyond the pad and have an attachment strip 52 under the pad of about 1-2", for a total fabric width of 8" to 1' 2".

In one embodiment, the weight of the equipment pad 10 alone anchors the assembly 50 to the ground along a pad attachment strip 52 of the assembly 50. In another embodiment, mechanical fasteners (e.g., screws) are used to attach the pad attachment strip 52 to the underside of the pad 10. In yet another embodiment, the pad attachment strip 52 is folded up and attached, with fasteners, to the sides 16, 17 of the equipment pad 10. In yet another embodiment, the assembly 50 includes a long rectilinear, curvilinear, or similarly functional plastic or metal section 151 (FIG. 15) along the pad attachment strip 52 to facilitate mechanical fastening of the assembly 50 to the pad 10. FIGS. 37-42 illustrate attachment strips 52 along edges or sides of the soil retention barrier 25 featuring one or more reinforced attachment areas. Extra stitching or more substantial material in this area are two types of reinforcement that may allow fasteners to be inserted directly through the material. One or more attachment holes 215 or grommets aid the installer and protect the material. As mentioned, a more reliable, durable, stronger, or stiffer material that is more suitable for mechanical fastening to the equipment pad 10 may be employed as an attachment section or member 151 at the attachment strip 52. In FIG. 37, the attachment strip 52 comprises a guard 153 that protects the attachment area from lawn maintenance like weed whacking. The guard 153 may be a flexible, but strong, material that is lifted up to make attachments and then returns to its protective position, or the guard 153 may be a stiffer material, and may be put in place over the attachment area later. In general, the attachment strip 52 and guard 153 are more resistant than the soil retention barrier 25 in terms of abrasion, tearing, cutting, and impact, for example.

Figure 40:
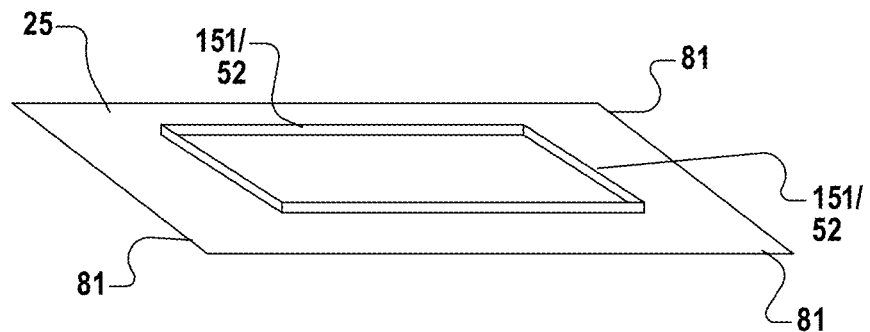
FIG. 40 is a perspective view of a skirt of flexible soil retention material comprising a reinforced attachment strip.
Figure 41:
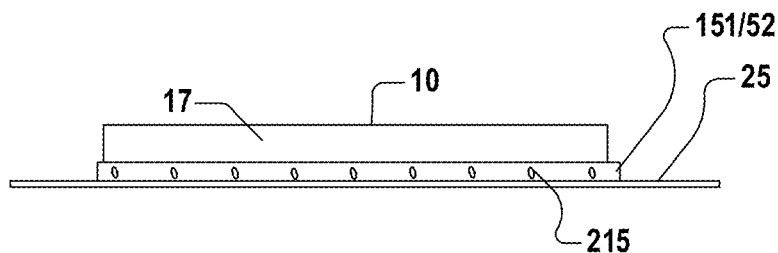
FIG. 41 is a side view of the skirt of FIG. 40 placed around an equipment pad.
Figure 42:
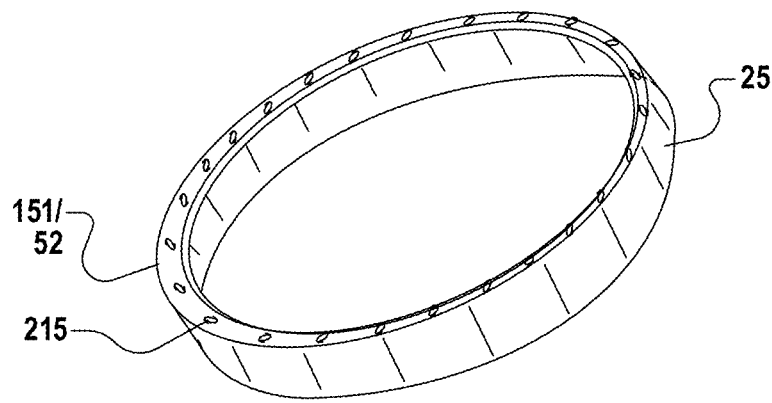
FIG. 42 is a perspective view of a flexible soil retention material comprising a reinforced attachment strip.

FIGS. 40-42 show a skirt-like soil retention barrier 25 having a reinforced attachment area wherein the attachment strip 52 may comprise an attachment member 151 that is more durable and suitable for mechanical attachment than the soil retention material alone. For example, a plastic, rubber, or composite material shaped and sized to fit around an equipment pad 10 ideally provides for secure attachment and fits snugly enough to provide some seal and reduce incursion of water between the pad 10 and the attachment member 151. The circular attachment member 151 and barrier 25 of FIG. 42 is manipulable to fit a rectangular pad 10 and, depending upon the material used, to be compressed for packaging and shipping. The opposing, unjoined portions of the soil retention barrier 25 at its distal ends 81 are free to overlay the ground or to be inserted into the soil. In another embodiment, a semi-rigid square strip 52 sized to fit a standard support pad 10 is provided. The soil retention barrier 25 is not limited to one piece, but may comprise multiple pieces of material configured to overlap when installed, and whether one piece or multiple pieces may be a full or partially surrounding skirt.

Figure 3:
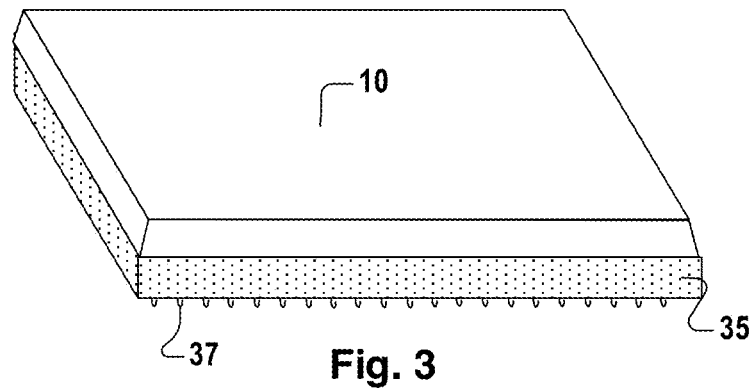
FIG. 3 is a perspective view of an equipment pad surrounded by a substantially vertical skirt of silt fabric tucked or inserted downwardly into the surrounding soil.

Returning to the embodiments depicted in FIGS. 3, 4 and 5B, the erosion control apparatus may come pre-attached to the equipment pad 10. For plastic pads, the erosion control apparatus may be molded, welded, glued, chemically bonded, and/or mechanically attached to the pad during production. For concrete pads, the erosion control apparatus may be tucked into foam or cemented in place.

For pads with a pre-attached dual-layer fabric assembly 50 as shown in FIG. 5B, the portions of fabric assembly 50 extending beyond the pad edges are not attached to each other, so that the bottom layer or silt fence 35 may be tucked into the ground without tucking or wadding the top layer of percolating fabric 40. In one embodiment, the top layer of percolating fabric 40 is formed across the entire underside of the pad 10 to provide additional ground support. Assuming there are no gaps between the pad edge and fabric 40, a drainage path is not likely to form under the pad 10.

Figure 6:
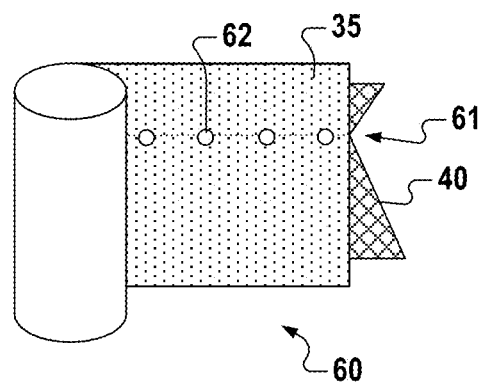
FIG. 6 is a perspective view of a roll of a multi-layered fabric assembly specially configured for use in minimizing soil erosion under and proximate an equipment pad.

FIG. 6 is a perspective view of a roll of a multi-layered fabric assembly 60 specially configured for use in minimizing soil erosion under and proximate an equipment pad 10. In an exemplary embodiment, the fabric assembly 60 comprises a fabric silt fence 35 attached at regularly spaced and linearly arranged stitch, weld, or pin attachment points 62 along an adjoinment strip 61 to a porous, percolating fabric 40. The adjoinment strip 61 is spaced approximately 1 to 2 inches from the inside edges of the silt fence 35 and percolating fabric 40. In the exemplary embodiment, the adjoinment strip 61 is not continuously melted or stitched together. Rather, regularly spaced and linearly arranged spot welds, stitches, or pins are provided to attach the layers together so that the contractor can easily detach the layers at the pad corners.

This fabric assembly 60 may be easily carried to a jobsite and cut to fit any size or brand of equipment pad 10. In operation, the fabric assembly 60 is unrolled, cut to length, and placed around and under the perimeter of the pad 10. To install, the top layer of percolating fabric 40 is folded up, the lower fabric layer or silt fence 35 is tucked into the ground, and the top layer of percolating fabric 40 is then placed back on the ground and pinned at the corners.

Figure 7:
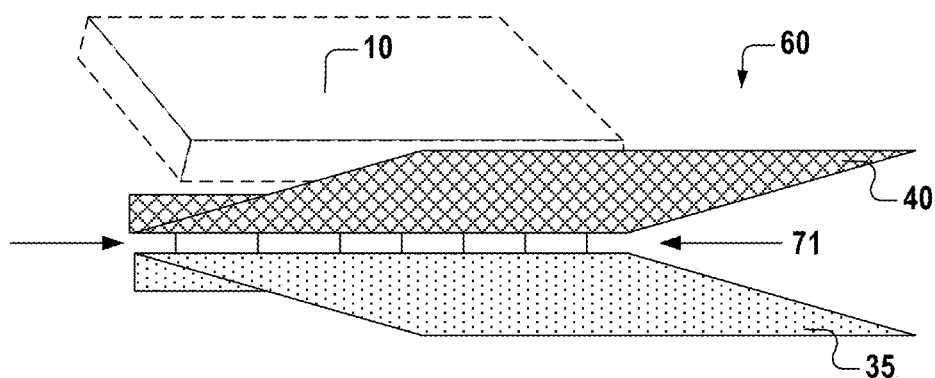
FIG. 7 is a perspective view of a multi-layered fabric assembly suitable for erosion control laid out next to a side of an equipment pad.
Figure 8:
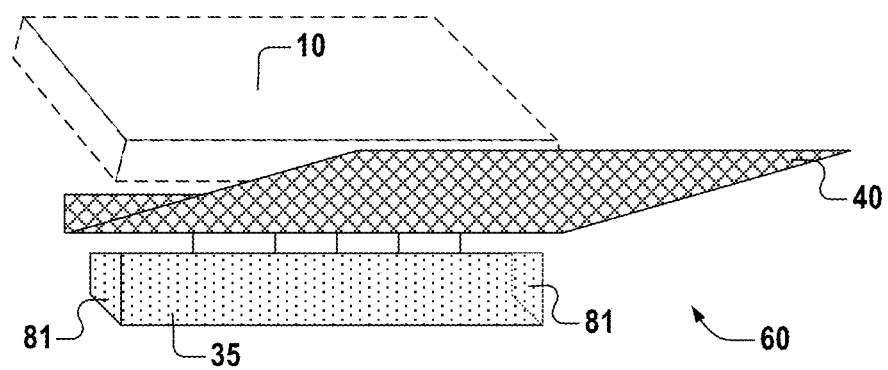
FIG. 8 is a perspective view of the multi-layered fabric assembly of FIG. 7 after attachment points proximate the pad corners have been severed.
Figure 9:
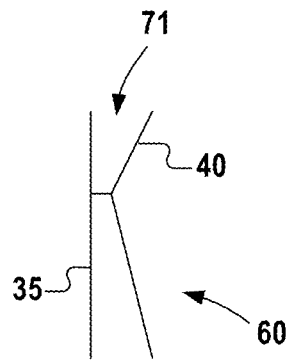
FIG. 9 is a cross-sectional view of one embodiment of a loosely-connected multi-layered fabric assembly.

In a further embodiment, the two fabrics 35 and 40 are joined loosely as shown in FIGS. 7-9. Stitches with slack, or welded areas that have been pulled and elongated while still melted, provide a space 71 of 1/32" to 1/8". An installer can quickly and easily run a blade through that space 71 to sever attachment points near the pad corners. This frees the distal ends 81 of the bottom fabric 35 to be tucked into the ground without inserting or wadding the top layer.

Figure 10:
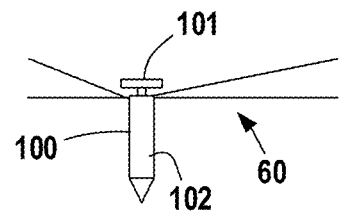
FIG. 10 is a side view of a multi-layered fabric assembly with a pin inserted through an attachment point.
Figure 11:
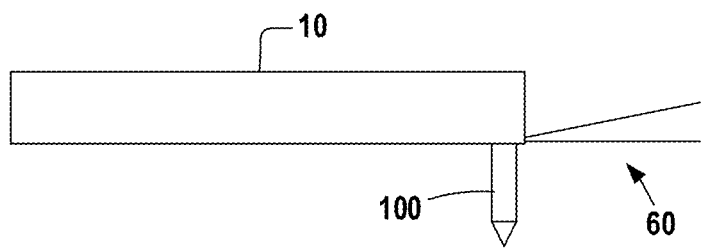
FIG. 11 is a side view of a multi-layered fabric assembly joined by a landscape pin under an equipment pad.

In the embodiment of FIG. 10, pins 100 (preferably 3-4" long, and made of plastic or metal) are pre-placed on the fabric assembly 60, forming part of the spot attachment of the two fabrics 35 and 40. In one particular embodiment, as the plastic fabric is heated/welded/tacked at certain points, a pin 100 is attached at the same time. In another embodiment, the pins 100 form the only source of attachment of the two fabrics 35 and 40.

During installation, an installer turns the pin 100 down into the ground to anchor the fabric assembly 60. To detach the fabric assembly 60 at the pad corners, the installer removes the necessary pins 100, using them to anchor the outside corners of the upper layer of percolating fabric 40 at the end of the installation.

Figure 12:
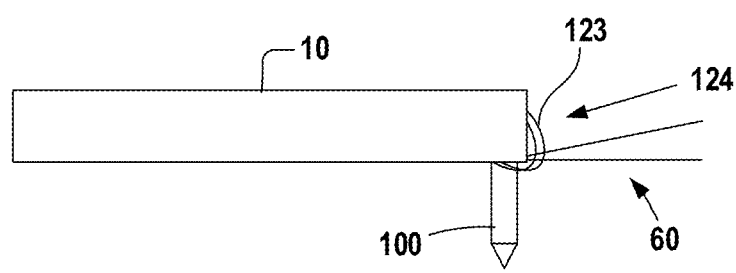
FIG. 12 is a side view of a multi-layered fabric assembly joined by a landscape pin mounted to an attachment strip configured for attachment to the equipment pad.
Figure 13:
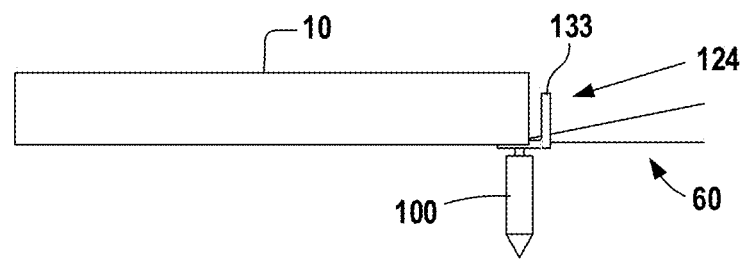
FIG. 13 is a side view of a multi-layered fabric assembly joined by a landscape pin mounted to a bracket configured for attachment to the equipment pad.
Figure 14:
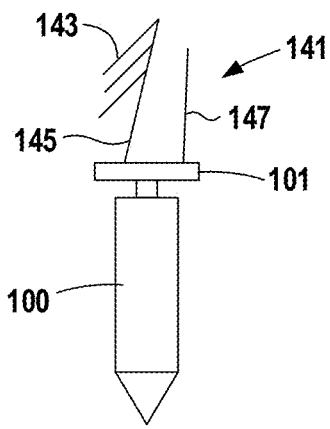
FIG. 14 is a side view of a toothed clip mounted on a landscape pin, the toothed clip being configured to mount the landscape pin to an equipment pad.
Figure 16:
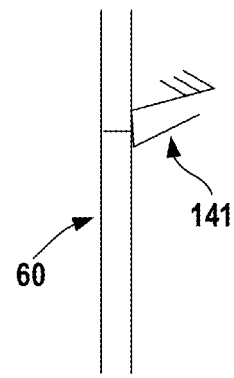
FIG. 16 is a cross sectional view of a multi-layered fabric assembly joined to a toothed clip.

Several embodiments are contemplated for attaching the fabric assembly 60 to the pad 10. In one embodiment, depicted in FIGS. 10-12, the pin 100 comprises a pin head 101 narrowly attached to a pin body 102 in a manner that forms a gap between the pin head 101 and the pin body 102. In FIG. 12, the pin 100 includes an attachment strap 123 configured to be folded up against the side of the pad 10 and mechanically fastened thereto with a screw or other fastener 124. In yet another embodiment, depicted in FIG. 13, the pin 100 includes a bracket 133 configured to abut the side of the pad 10 and be mechanically fastened thereto with a screw or other fastener 124.

FIGS. 14-20 illustrate several embodiments utilizing a plastic or metal clip 141 to attach a multi-layered fabric assembly 60 to an equipment pad 10. The plastic or metal clip 141 includes two biased tabs 145 and 147 for clamping an equipment pad edge or rib. In the embodiment shown in FIGS. 14, 16-17, and 19-20, the clip 141 also includes outwardly facing foam-gripping teeth 143 along tab 145. In another embodiment, not shown, the tabs 145 and 147 include sharp, inwardly facing teeth configured to be closed by pliers to bite into a plastic edge or rib of the equipment pad. In yet another embodiment, depicted in FIG. 18, the teeth are entirely omitted from the tabs 145 and 147. In another embodiment, not shown, the clip 141 includes a toothed tab 145 without a cooperating clamping tab 147.

Figure 15:
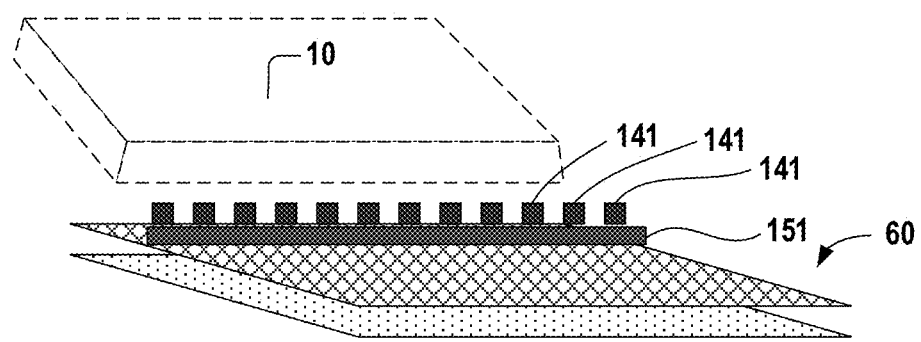
FIG. 15 is a perspective view of a multi-layered fabric assembly joined to an attachment strip joined to a plurality of toothed clips for mounting the multi-layered fabric assembly to an equipment pad.

In the embodiments depicted in FIGS. 16-20, the clip 141 is mounted to a multi-layered fabric assembly 60. In one embodiment, depicted in FIG. 14, the clip 141 is also mounted on the head 101 of a landscape pin 100. In FIG. 15, a row of clips 141 is joined to a solid (e.g., plastic or metal) attachment strip 151 for mounting a large section of multi-layered fabric assembly 60 to a side of the equipment pad 10.

The clip 141 is configured to mount the fabric assembly 60 to an equipment pad in one or more of many different ways. In FIG. 17, the clip 141 is inserted into the foam core 171 of an equipment pad 10. In FIG. 18, the clip is coupled to the side of an equipment pad 10 via a screw or other mechanical fastener 181. In FIG. 19, the clip 141 is clamped around an outside edge 191 of the equipment pad 10. In FIG. 20, the clip 141 is clamped around an internal rib 201 of the equipment pad 10. In both FIGS. 19 and 20, the clip is optionally further coupled to the equipment pad 10 with an anchoring screw or other mechanical fastener 181.

FIGS. 21-27 illustrate various embodiments and interlocking pieces of a hard-walled soil retention barrier. The pieces are tapered for easy insertion into the ground and interlock to form a continuous wall and rigid barrier. Although not shown in the drawings, the wall may include decorative features (e.g., faux stone) along the top.

Figure 21:
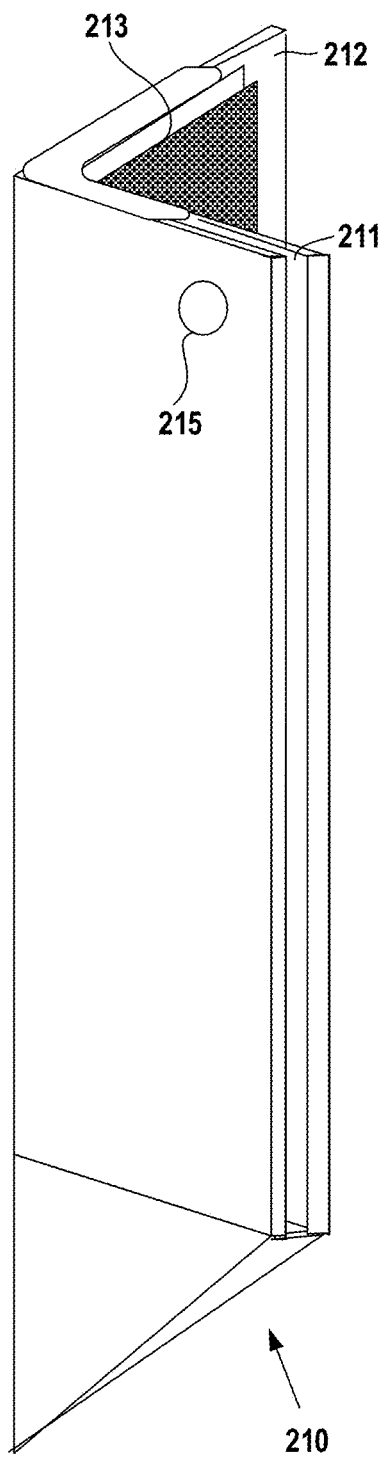
FIG. 21 is a perspective view of one embodiment of a corner stake used to form part of a hard-walled soil erosion barrier.
Figure 22:
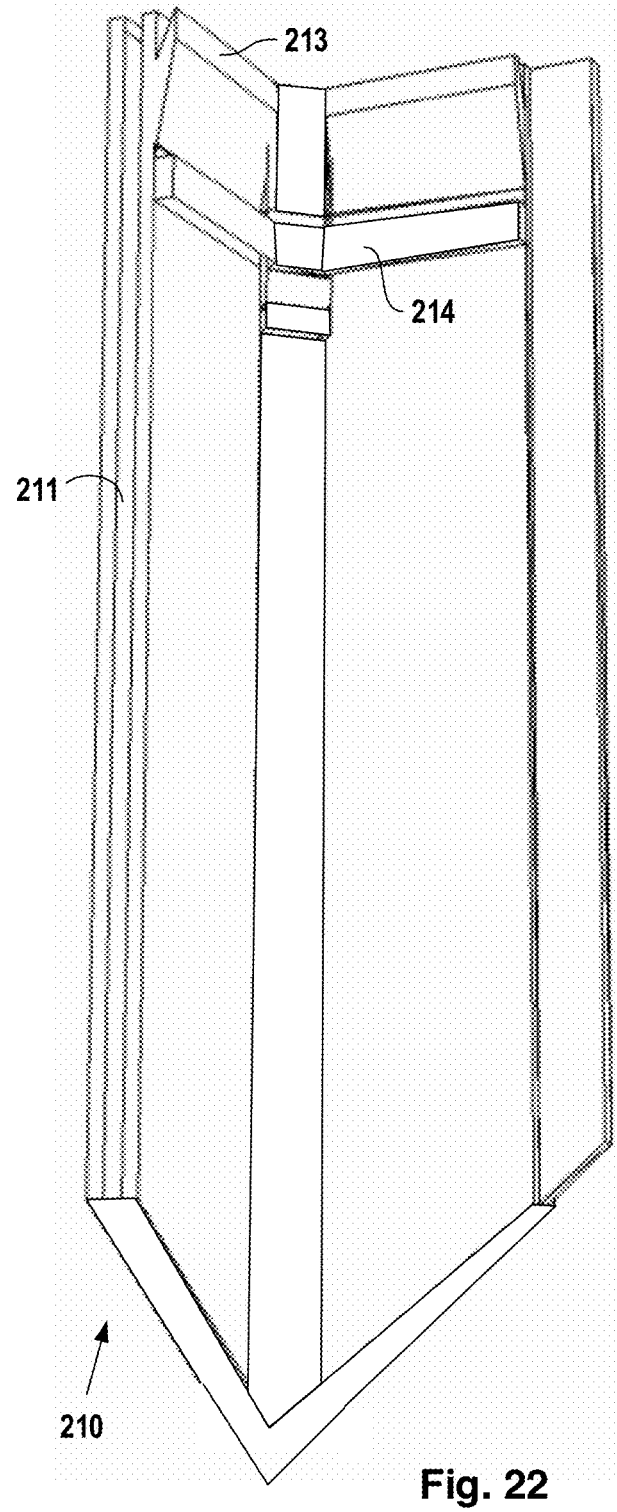
FIG. 22 is an inside perspective view of the corner stake of FIG. 21

FIGS. 21 and 22 illustrate a corner stake or anchor 210 with dimensions of approximately 4"×4"×12". The corner stake 210 is substantially continuous at the corner, such that soil will not wash out from under the corner of the equipment pad 10. This design is an improvement over corners that are open or highly porous. One side of the corner stake 210 includes a channel 211 for receiving a cooperating tab or projection of an interlocking side wall piece 231. The other side of the corner stake 210 includes a tab or projection 212 for inserting into a cooperating channel of a side wall piece 231. The channel 211 and tab 212 may extend along all of or less than the full length of corner stake 210.

An alignment shelf 214 is provided along the backside of the corner stake 210 to rest under the pad edge. A gasket or sealing boss 213, which may be shaped like a wiper blade, is provided along the top of the backside of the corner stake 210. The sealing boss 213 seals the corner stake 210 against the side of the equipment pad 10, blocking the flow of water therebetween. Also, the sealing boss 213 accommodates a variety of corner radii and side slopes. A fastening hole 215 is provided for inserting a machine screw, concrete screw, nail, or other mechanical fastener. The hole 215 may be located such that two adjacent wall portions 231 are attached to the pad 10 with one fastener.

Figure 23:
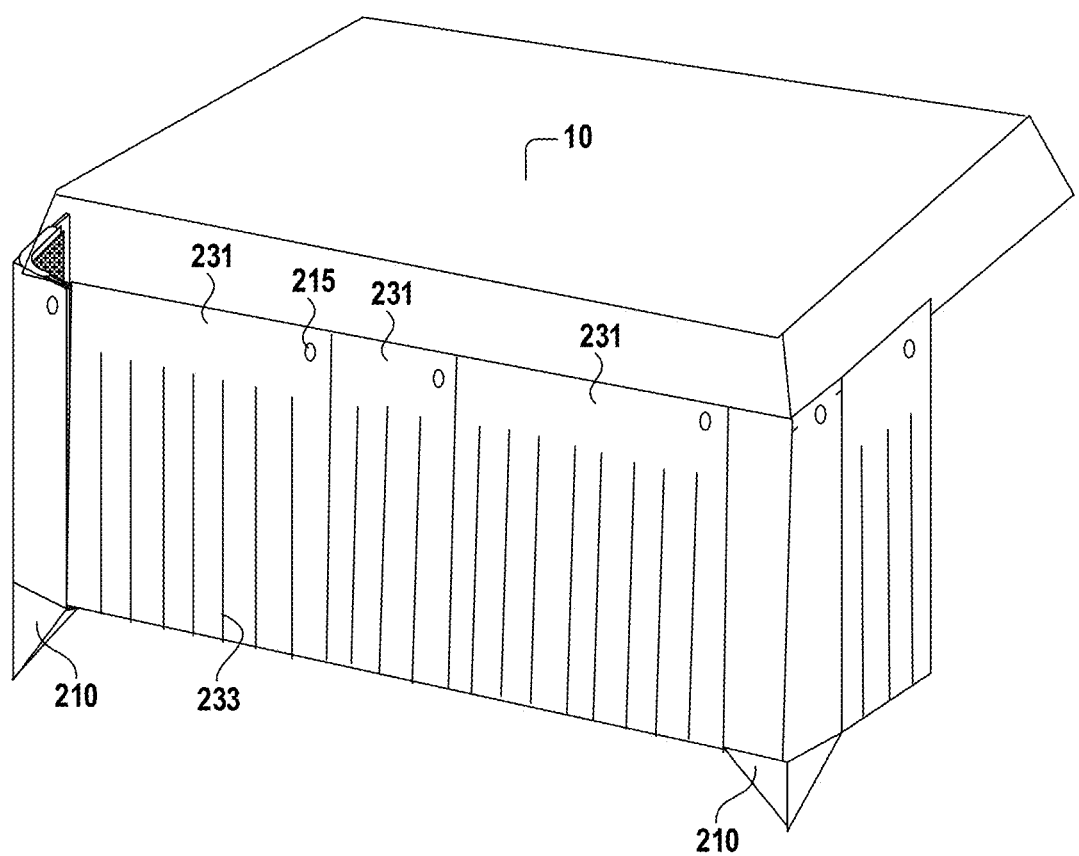
FIG. 23 is a perspective view of a hard-walled soil retention apparatus comprising a plurality of corner stakes and side wall pieces attached to an equipment pad.

As shown in FIG. 23, a plurality of sidewall pieces 231 of varying widths (e.g., 1", 2", 4", 8", 16") is also provided. Although not shown in the drawings, the sidewall pieces 231, like the corner stakes 210, include a channel along one vertical side and a projecting tab along the other vertical side. In this manner, the corner pieces and sidewall pieces can be assembled to interlock with each other, and be driven into the ground. Also like the corner stakes 210, the sidewall pieces 231 include an alignment shelf or protrusion (not shown) to facilitate alignment of the interlocking pieces. The sidewall pieces 231 may also include gaskets or sealing bosses and fastening holes 215.

In one embodiment, the sidewall pieces are also ribbed and scored at 1" increments so a contractor can cut to length and still interlock the cut piece with the piece next to it. The sidewall pieces 231 may also be shaped, thinned, or perforated between the ribs 233 or along the scored sections to aid driving them into the ground.

Figure 24:
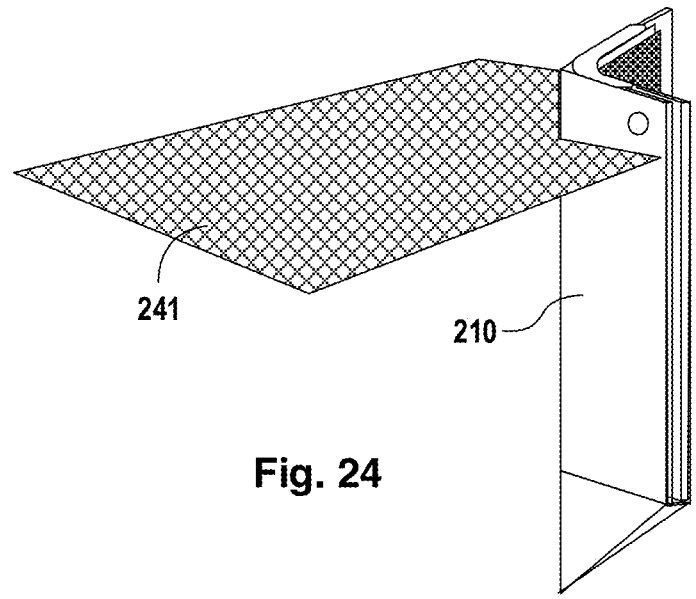
FIG. 24 is a perspective view of one embodiment of a corner stake and percolating fabric assembly.
Figure 25:
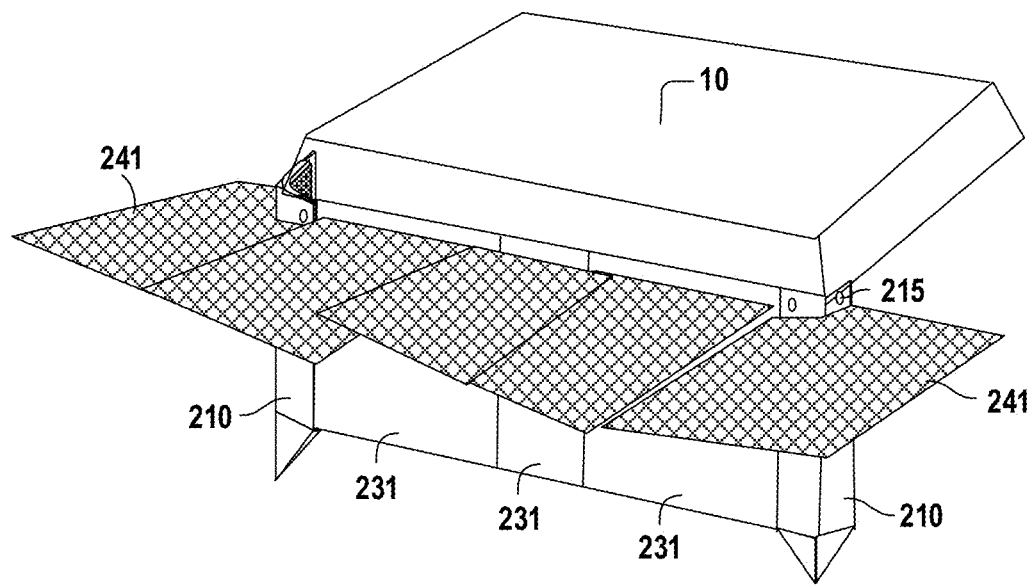
FIG. 25 is a perspective view of one embodiment of an erosion control apparatus comprising a combination of a hard-walled soil retention apparatus and a flexible percolating fabric.

FIGS. 24 and 25 depict an embodiment in which percolating fabric sections 241 are pre-attached to the corner stakes 210 and sidewall pieces 231. FIG. 25 depicts several of these corner and sidewall pieces assembled together and installed on an equipment pad 10. The fabric sections 241 may be pre-attached above or below the fastening holes 215.

Figure 26:
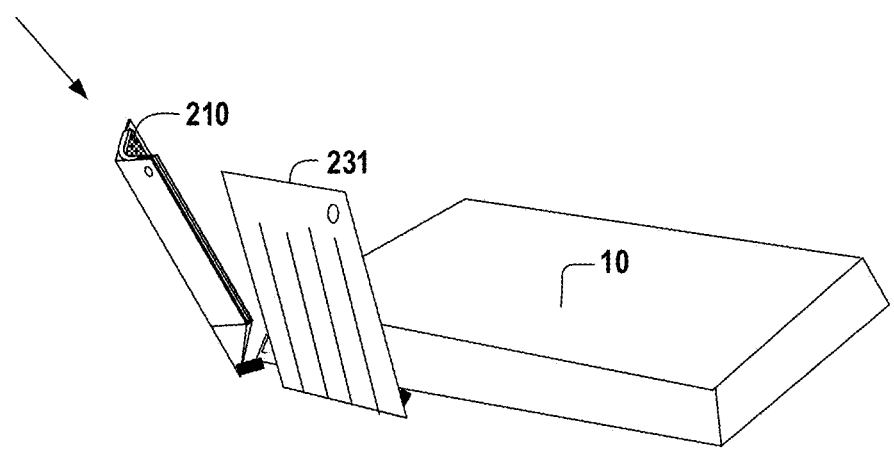
FIGS. 26 and 27 are perspective views of one embodiment of an equipment pad with pre-attached corner and side wall pieces.
Figure 27:
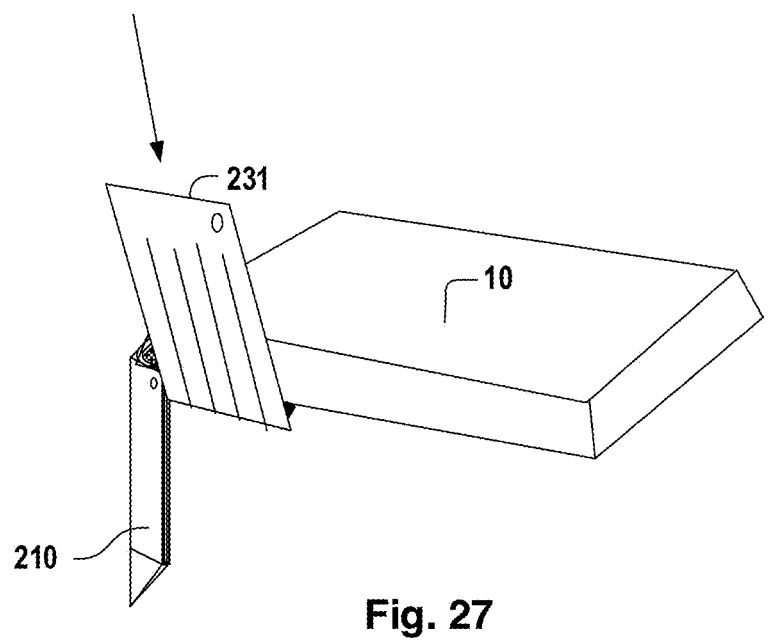

Hard walls may also come pre-attached to a pad 10 at the factory. FIGS. 26 and 27 are perspective views of one embodiment of an equipment pad 10 with pre-attached corner and side wall pieces. When the pad 10 is at a jobsite, a contractor may simply set the pad 10 on the ground, aim the corner and side wall pieces 210 and 231 straight down, and hammer them. When hammered, the pieces break free from the pad 10 and go into the ground.

In one embodiment, not shown, equipment pads 10 are provided that have dovetail notches formed on the bottom edges. The dovetail notches facilitate attachment of the corner and side pieces of the hard-walled soil retention barrier. The corner and side pieces may have corresponding protrusions to allow dovetailing, snapping, or "locking" in place. In another embodiment, not shown, the equipment pads 10 have spikes or fingers, shaped like picture hangers, along the bottom edges. An erosion control apparatus is mounted over these spikes and held in place.

FIG. 28 illustrates one embodiment of an installation tool 280 to facilitate insertion of both soft-walled and hard-walled soil retention barriers into the ground. The installation tool 280 comprises a force distribution upper member 281 joined to substantially planar, wedge-shaped lower member 282. The upper member 281 is preferably triangularly shaped or arc shaped to distribute the force of a hammer blow across the full width of the wedge-shaped lower member 282. As shown in FIG. 29, the installation tool 280 may be folded along a thinned vertical midsection 283 for inserting soil retention barriers proximate to the corners of an equipment pad. The installation tool 280 is constructed of metal, wood, or plastic, or some combination thereof.

To insert a rigid side wall piece, the side wall piece is hammered partway into the ground. Then the installation tool 280 is placed on top of the side wall piece against the side of an equipment pad. To insert a rigid corner piece, the installation tool 280 is folded approximately 90 degrees along its midsection 283 before being placed along the corner of an equipment pad. A hammer, mallet, or other tool is then used to pound the rigid piece into the ground, such that the hammer does not strike the pad 10 as the rigid piece is driven below the top surface of the pad and close to grade. The rigid side wall or corner piece may be driven into the ground with the installation tool 280, or after the installation tool 280 has been pounded into the ground. To insert a soft-walled, fabric-based erosion control barrier, the wedge-shaped lower member 282 is pinned against the fabric and used to drive it into the ground. Thus, the walls may be installed without traditional trenching, even around corners.

FIG. 30 illustrates another embodiment of an installation tool 300. This installation tool 300 comprises first and second substantially planar, wedge-shaped bottom members 302 and 304, with second bottom member 304 projecting out perpendicularly from one side (but not the other) of the first bottom member 302. The installation tool 300 also includes a force distribution top member 301 that distributes the force of a hammer blow across the full extents of the first and second bottom members 302 and 304.

To insert a side wall piece, the side wall piece is hammered partway with a hammer or mallet. Then the installation tool 300 is placed on top of the side wall piece with the flat side 303 of the installation tool 300 facing toward the side of an equipment pad, and then the side wall piece is pounded into the ground via the installation tool 300. To insert a corner piece, the first and second bottom members 302 and 304 are laid on top of the corner piece, with the corner facing the corner of an equipment pad, and then the corner piece is pounded into the ground.

It is contemplated that the installation tool 280 or 300 may be packaged as part of a kit that includes components of any of the erosion control apparatuses described herein.

Figure 31:
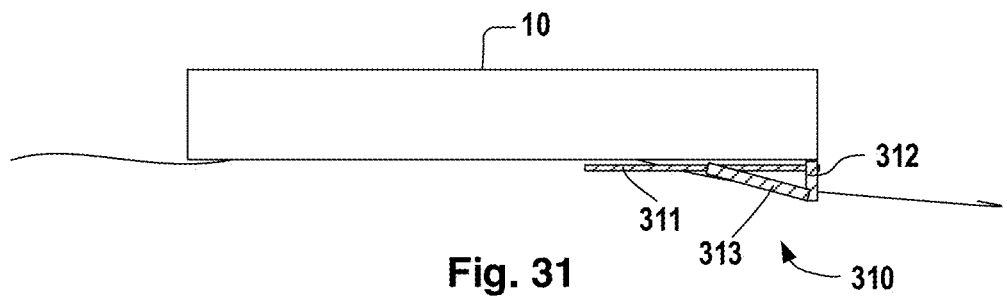
FIG. 31 illustrates an embodiment of an equipment pad support member.
Figure 32:
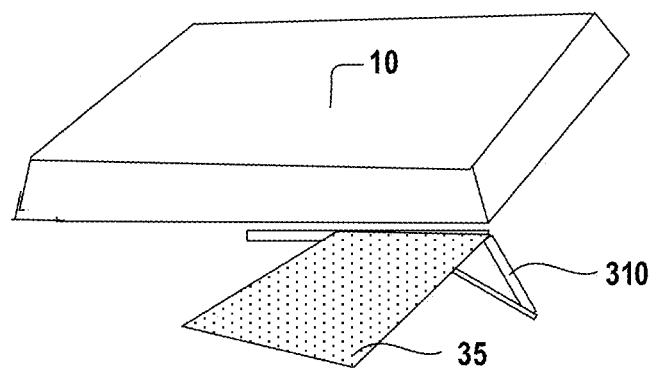
FIGS. 32-33 illustrate embodiments of an equipment pad support member attached to an erosion control apparatus.
Figure 33:
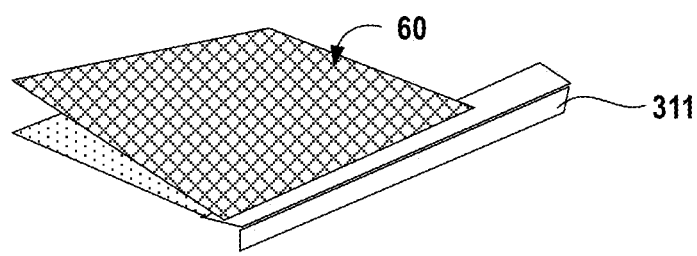

FIGS. 31-33 illustrate various embodiments of an equipment pad support member in the form of a wedge-able bracket 310, used to repair erosion underneath an equipment pad 10 and level the pad 10. The bracket 310 comprises three pivotally attached segments or bars 311, 312, and 313. The horizontal segment 311 and angle segment 313 may be hammered underneath the pad edge, wedging the vertical or prop segment 312 underneath the pad 10 to push the pad 10 up. It is contemplated that several such brackets 310 be used at spaced-apart intervals to support the pad 10, in order to prevent the pad 10 from cracking or bowing.

In FIGS. 32-33, the bracket 310 is pre-attached to an erosion control apparatus. In FIG. 32, the erosion control apparatus comprises a soil retention fabric section 35. In FIG. 33, the erosion control apparatus comprises a multi-layered fabric assembly 60. In FIG. 33, only the top segment 311 of the bracket 310 is shown.

Figure 34:
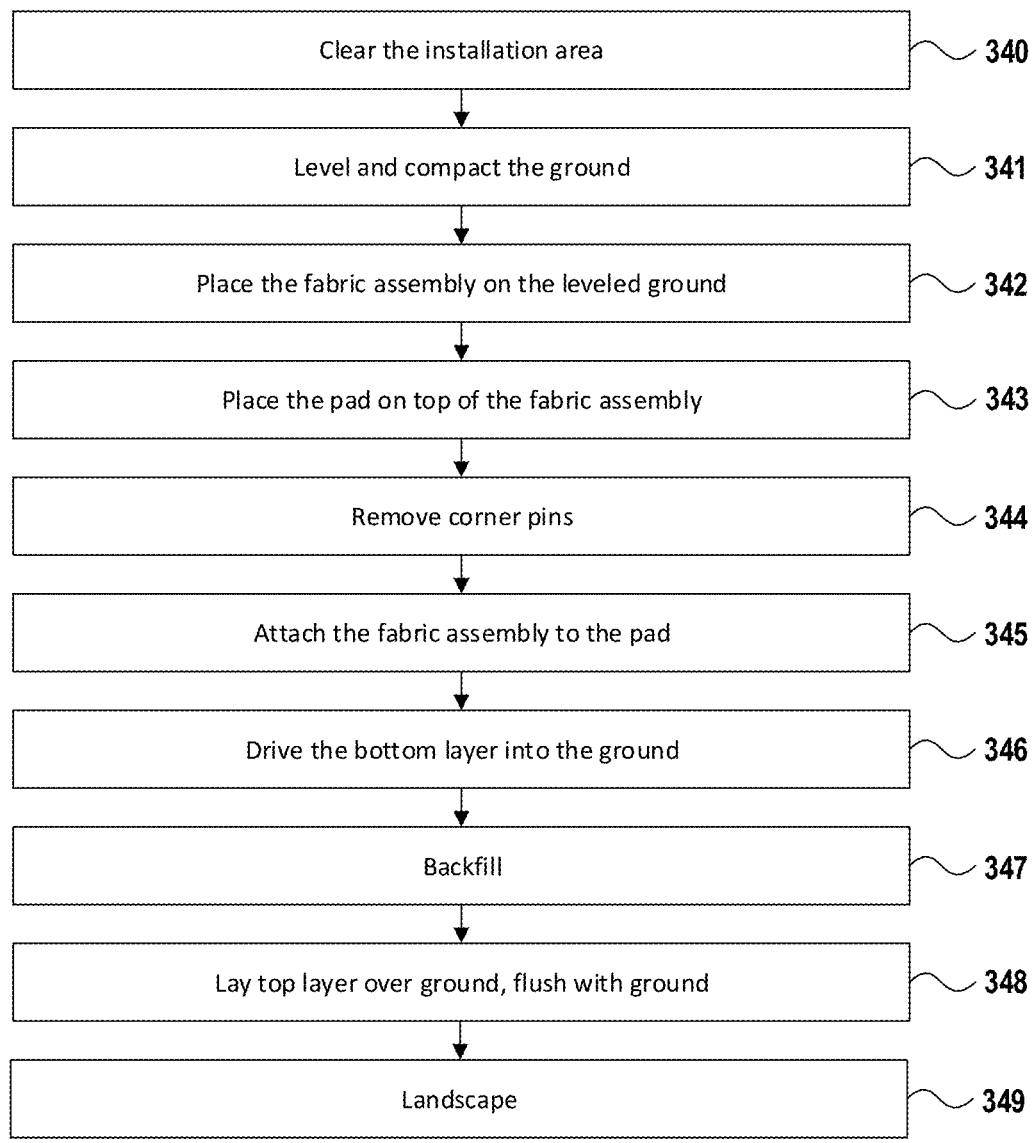
FIG. 34 is a flow chart of one embodiment of a method of installing a new equipment pad with a multi-layered fabric assembly.

FIG. 34 is a flow chart of one embodiment of a method of installing a new pad 10 with a multi-layered fabric assembly 60. In step 340, clear the installation area of leaves, mulch, and loose topsoil until firm ground is reached beyond the edges of the where the pad 10 is to be located. In step 341, level and compact the ground. Backfill, if necessary, to ensure that the pad 10 will sit on substantially level ground. In step 342, place the multi-layered fabric assembly 60 on the leveled ground, with the silt fence 35 on the bottom and the 3D percolating fabric layer 40 on top, and insert landscape pins through the percolating fabric layer 40 into the ground. Alternatively, attach the multi-layered fabric assembly 60 to the pad 10 prior to placing the pad 10 on the ground.

In step 343, place the pad 10 on the ground so that the fabric of the multi-layered fabric assembly 60 extends 6"-12" beyond each side of the pad. In step 344, remove any landscaping pins that are visible from the corners of the multi-layered fabric assembly 60, and save them for later use. In step 345, attach the multi-layered fabric assembly 60 to the pad 10. It is desirable to take care that all walls are held in place by the weight of the pad 10 and/or attached to the pad 10. Otherwise, the walls may give way over time. In step 346, lift the top percolating fabric layer 40 and drive the silt fence fabric layer 35 straight down into the ground, using the installation tool 280 or 300, all around the pad 10. The fabric mimics the soil retaining effect of landscape timbers. In step 347, backfill soil outside of the fabric up to the bottom of the pad 10. Compact the soil and repeat until the ground level is flush with the pad bottom.

In step 348, place the top percolating fabric layer 40 flush with the ground, thus mimicking the percolating effect of river rock. Using the pins saved in step 344, drive pins through the percolating fabric corners into the ground to secure the percolating fabric layer 40 in place. Finally, in step 349, landscape around the pad 10 to hide the multi-layered fabric assembly 60.

Figure 35:
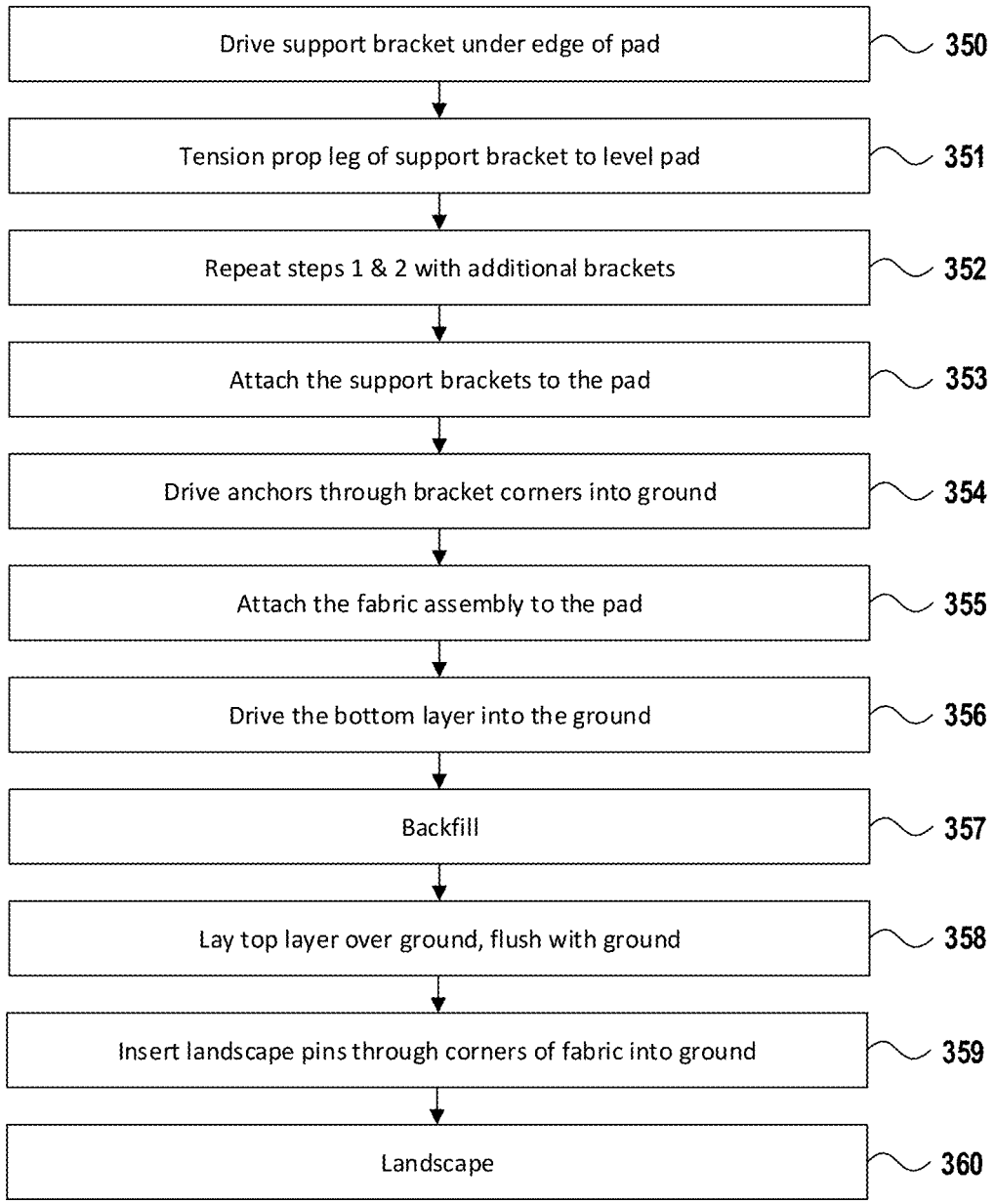
FIG. 35 is a flow chart of one embodiment of a method of repairing erosion underneath an equipment pad.

FIG. 35 is a flow chart of one embodiment of a method of repairing erosion underneath a pad 10 using the support brackets 310 of FIG. 31 and a multi-layered fabric assembly 60. In step 350, align one support bracket 310 under an edge of the pad 10, with the multi-layered fabric assembly 60 sticking out from under the pad 10. Drive the support bracket 310 into the earth parallel to the edge of the pad 10. In step 351, place the prop segment 312 of the support bracket 310 under the pad corner and tension until the pad 10 is level. In step 352, repeat steps 1 and 2 with additional brackets. In step 353, attach the support brackets 310 to the pad 10. In step 354, drive anchors (e.g., pins) through the bracket corners into the earth.

In step 355, attach the fabric assembly 60 to the pad 10. Take care that the multi-layered fabric assembly 60 is held in place by the weight of the pad 10 and/or attached to the pad 10. Otherwise, the fabric assembly 60 may give way over time. In step 356, lift the upper percolating fabric layer 40 on the downslope side of the pad 10 and drive the silt fence 35 into the ground, using installation tool 280 or 300, until the corners are in place. In step 357, backfill under the pad 10. From the sides, fill in any dirt or concrete to support the pad 10. Place bricks, rocks, dirt, soil socks, etc. under the pad 10. Pack the dirt. Also, lift the upper percolating fabric layer 40 and backfill dirt against the silt fence 35 on the downslope side of the pad 10. In step 358, place the upper percolating fabric layer 40 flush with the ground around the pad 10. In step 359, insert landscape pins through the corners of the percolating fabric layer 40 into the ground. Finally, in step 350, landscape around the pad 10 to hide the multi-layered fabric assembly 60. Be careful not to add landscaping that is high enough to interfere with the pad height or the inflow of air to the unit.

In both FIGS. 34 and 35, many of the steps are optional, and the order of the steps may in many instances be re-arranged. Instructions for installation of hard wall solutions are similar.

It will be understood that many modifications could be made to the embodiments disclosed herein and in the incorporated provisional application and its appendix without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein, but is limited only by the following claims.

I claim:

1. A flexible erosion control barrier for an outdoor equipment support pad for a condenser, generator, or transformer having side walls that meet to define at least one side corner that runs from the top surface to the bottom surfaces of the support pad, the flexible erosion control barrier comprising:
    a geosynthetic soil retention barrier that is a full or partially surrounding skirt having a reinforced attachment edge section and a remaining area, wherein:
        the edge section, which extends along a side or edge of the geosynthetic soil retention barrier, comprises more stitching, thicker or more tear-resistant material, grommets, or a combination thereof than the remaining area and is thus more durable and resistant to tearing than the remaining area;
        the edge section has the size to fit and the flexibility to bend around a portion of a perimeter, including the at least one side corner, of the support pad, and is structured for attachment along at least two sides of the perimeter of the support pad;
        the edge section facilitates mechanical attachment of the geosynthetic soil retention barrier to the support pad below the top surface of the support pad, and anchors the remaining area to extend from the reinforced attachment edge section to an opposing side or edge that remains unjoined to the support pad;
        the remaining area is bendable upwards or downwards from the edge section when the edge section is attached to the outdoor equipment support pad; and
        the remaining area is configured for use with an insertion tool to be tucked into soil surrounding the pad and below the bottom surface of the support pad without necessitating excavation.

2. The flexible erosion control barrier of claim 1, wherein the geosynthetic soil retention barrier is configured to form an erosion-resisting corner fold in the ground around the soil under the at least one side corner of the support pad.

3. The flexible erosion control barrier of claim 1, wherein the geosynthetic soil retention barrier is configured with pore openings small enough to prevent soil from passing through.

4. The flexible erosion control barrier of claim 1, wherein the geosynthetic soil retention barrier is configured to overlay the ground to re-direct drainage.

5. The flexible erosion control barrier of claim 1, wherein the geosynthetic soil retention barrier comprises multiple pieces that are attached to the support pad and configured to overlap.

6. The flexible erosion control barrier of claim 1, further comprising a gasket or other seal located along the reinforced attachment edge section along the side or edge of the geosynthetic soil retention barrier and, when attached to the support pad, located between the side walls and the geosynthetic soil retention barrier and configured to reduce incursion of water between the geosynthetic soil retention barrier and side walls.

7. The flexible erosion control barrier of claim 1, wherein the edge section comprises a long semi-rigid strip of material located lengthwise along the reinforced attachment edge section and configured to aid attachment and/or to protect the reinforced attachment edge section from damage due to lawn maintenance after installation.

8. The flexible erosion control barrier of claim 1, wherein the reinforced attachment edge section further comprises one or more attachment holes.

9. The flexible erosion control barrier of claim 1, wherein the geosynthetic soil retention barrier, when attached to the support pad, extends about 6 to 14 inches from the perimeter of the support pad.

10. The flexible erosion control barrier of claim 1, further comprising one or more beams or brackets configured for placement under the support pad and above sloped, eroded soil to level the support pad.

11. The flexible erosion control barrier of claim 1, wherein the geosynthetic soil retention barrier comprises a section that is longer at the at least one corner of the support pad than at the middle of the sides of the support pad.

12. The flexible erosion control barrier of claim 1, the geosynthetic soil retention barrier further comprising barbs on the remaining area's unjoined opposing side or edge.

13. An erosion control kit for an outdoor equipment support pad for a condenser, generator, or transformer having side walls that meet to define at least one side corner that runs from the top surface to the bottom surfaces of the support pad, the kit comprising:
    (a) a flexible, geosynthetic soil retention barrier that is a full or partially surrounding skirt having a reinforced attachment edge section and a remaining area, wherein:
        the edge section, which extends along a side or edge of the geosynthetic soil retention barrier, comprises more stitching, thicker or more tear-resistant material, grommets, or a combination thereof than the remaining area and is thus more durable and resistant to tearing than the remaining area;
        the edge section has the size to fit and the flexibility to bend around a portion of a perimeter, including the at least one side corner, of the support pad, and is structured for attachment along at least two sides of the perimeter of the support pad;

the edge section facilitates mechanical attachment of the geosynthetic soil retention barrier to the support pad below the top surface of the support pad, and anchors the remaining area to extend from the reinforced attachment edge section to an opposing side or edge that remains unjoined to the support pad; and the remaining area is bendable upwards or downwards from the edge section when the edge section is attached to the outdoor equipment support pad; and (b) an insertion tool configured to tuck the remaining area of the geosynthetic soil retention barrier into soil surrounding the pad without necessitating excavation.

14. The erosion control kit of claim 13, wherein the edge section comprises a long semi-rigid strip of material located lengthwise along the reinforced attachment edge section and configured to aid attachment and/or to protect the reinforced attachment edge section from damage due to lawn maintenance after installation.

15. The erosion control kit of claim 13, wherein the geosynthetic soil retention barrier comprises multiple pieces that are attached to the support pad and configured to overlap.

16. The erosion control kit of claim 13, the geosynthetic soil retention barrier further comprising barbs on the remaining area's unjoined opposing side or edge, the barbs being configured to be grasped by an insertion tool to anchor the geosynthetic soil retention barrier into the ground.

17. An erosion control kit for an outdoor equipment support pad for a condenser, generator, or transformer having side walls that meet to define at least one side corner that runs from the top surface to the bottom surfaces of the support pad, the kit comprising:

(a) a flexible, geosynthetic erosion control barrier having a reinforced attachment edge section configured to be attached to the support pad about a perimeter thereof and a remaining area configured to extend outward from the side walls of the support pad and resist erosion; and (b) one or more wedge-able beams or bracket configured for placement under the support pad and above sloped, eroded soil to level the support pad;

wherein the geosynthetic erosion control barrier is further configured to be manipulated into a soil-erosion-resisting configuration around the at least one side corner of the support pad after the support pad is placed above ground that is subject to erosion.

18. The kit of claim 17, wherein the edge section comprises a long semi-rigid strip of material located lengthwise along the reinforced attachment edge section and configured to aid attachment and/or to protect the reinforced attachment edge section from damage due to lawn maintenance after installation.

19. The kit of claim 17, wherein the geosynthetic erosion control barrier comprises multiple pieces that are attached to the support pad and configured to overlap.

20. The kit of claim 17, further comprising mechanical attachment members, wherein one attachment member is configured to attach the geosynthetic erosion control barrier to concrete side walls and plastic side walls.

* * * * *